US012750577B2

(12) United States Patent
Park et al.

(10) Patent No.: US 12,750,577 B2
(45) Date of Patent: Sep. 29, 2026

(54) IMAGE PROCESSING SYSTEM

(71) Applicant: SAMSUNG ELECTRONICS CO., LTD., Suwon-si (KR)

(72) Inventors: Dongjin Park, Suwon-si (KR); Seongwook Song, Suwon-si (KR); Sunyoung Yoo, Suwon-si (KR); Jeehong Lee, Suwon-si (KR); Sunghyuk Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/063,992

(22) Filed: Feb. 26, 2025

(65) Prior Publication Data

US 2026/0059185 A1 Feb. 26, 2026

(30) Foreign Application Priority Data

Aug. 23, 2024 (KR) ........................ 10-2024-0113531

(51) Int. Cl.

| | |
|---|---|
| ***H04N 23/55*** | (2023.01) |
| ***G06T 7/50*** | (2017.01) |
| ***G06T 7/90*** | (2017.01) |
| ***H04N 23/88*** | (2023.01) |
| ***H04N 25/611*** | (2023.01) |

(52) U.S. Cl.

CPC ............... *H04N 23/55* (2023.01); *G06T 7/50* (2017.01); *G06T 7/90* (2017.01); *H04N 23/88* (2023.01); *H04N 25/611* (2023.01)

(58) Field of Classification Search

CPC ...... H04N 23/55; H04N 23/88; H04N 25/611; H04N 23/672; H04N 23/67; H04N 23/673; H04N 25/60; H04N 25/61; G06T 7/50; G06T 7/90

See application file for complete search history.

(56) References Cited

U.S. PATENT DOCUMENTS

| | | | | |
|---|---|---|---|---|
| 6,963,388 | B1 * | 11/2005 | Ohta | H04N 23/673 348/E5.045 |
| 10,070,042 | B2 | 9/2018 | Nikkanen et al. | |
| 10,235,773 | B2 | 3/2019 | Li et al. | |

(Continued)

FOREIGN PATENT DOCUMENTS

| | | | |
|---|---|---|---|
| JP | 2005202276 | * | 7/2005 |
| JP | 2016-57402 | A | 4/2016 |
| JP | 6468742 | B2 | 2/2019 |

*Primary Examiner* — Albert H Cutler

(74) *Attorney, Agent, or Firm* — Sughrue Mion, PLLC

(57) ABSTRACT

An image processing system includes an optical lens, a lens driver, an image sensor, and a processor. The processor is configured to, based on a modeled relationship between a disparity and a position of the optical lens for each of a first to a third color channels, and further based on a position of the optical lens at which a sharpness of the third color channel is maximized, determine, for each color channel, a movement distance of the optical lens according to the disparity; determine a disparity value and a weight for each color channel from the image data; and apply the disparity value and the weight to the movement distance of the optical lens for each color channel, to determine a final movement distance of the optical lens. The lens driver is configured to move the optical lens according to the final movement distance.

20 Claims, 14 Drawing Sheets

(56) References Cited

U.S. PATENT DOCUMENTS

| | | | |
|---|---|---|---|
| 10,455,142 B2 | 10/2019 | Tamaki et al. | |
| 2016/0073007 A1* | 3/2016 | Konishi | H04N 23/673 348/349 |
| 2017/0019583 A1* | 1/2017 | Kobayashi | H04N 25/70 |
| 2017/0034463 A1* | 2/2017 | Hamano | H04N 25/704 |
| 2018/0349378 A1 | 12/2018 | Galor Gluskin et al. | |
| 2023/0262328 A1 | 8/2023 | Jeon et al. | |

* cited by examiner

IMAGE PROCESSING SYSTEM

CROSS-REFERENCE TO RELATED APPLICATION(S)

This application is based on and claims priority to Korean Patent Application No. 10-2024-0113531 filed on Aug. 23, 2024 in the Korean Intellectual Property Office, the disclosure of which is herein incorporated by reference in its entirety.

BACKGROUND

One or more example embodiments of the disclosure relate to an image processing system.

An image sensor may provide a phase-detection autofocus (PDAF) function for focusing on a subject, when capturing an image of the subject. A phase-detection autofocus (PDAF) technology may be a technology for determining whether the subject is focused by comparing phase differences of light divided in passing through a single micro lens arranged on phase-detection (PD) pixels located to be adjacent thereto, that is, phase differences of light incident on a pixel array, thereby enabling a camera to focus more quickly. A position of an optical lens, which is in focus, may be determined using a phase difference (or disparity) obtained from the PD pixels including a plurality of color channels, and the determined position of the optical lens may affect resolution of image data obtained from the image sensor.

SUMMARY

One or more example embodiments of the disclosure provide an image processing system in which resolution of an image may be improved by performing calibration for each color channel to focus on a green channel.

According to an aspect of an example embodiment of the disclosure, an image processing system includes an optical lens; a lens driver configured to move the optical lens; an image sensor configured to convert an optical signal transmitted from the optical lens into an electrical signal, to generate image data; and a processor configured to perform image signal processing on the image data, wherein the image data includes a first color channel, a second color channel, and a third color channel, wherein the processor is further configured to: based on a modeled relationship between a disparity and a position of the optical lens for each of the first to third color channels, and further based on a position of the optical lens at which a sharpness of the third color channel is maximized, determine, for each of the first to third color channels, a movement distance of the optical lens according to the disparity; determine a disparity value and a weight for each of the first to third color channels from the image data; and apply the disparity value and the weight to the movement distance of the optical lens for each of the first to third color channels, to determine a final movement distance of the optical lens, and wherein the lens driver is further configured to move the optical lens according to the final movement distance of the optical lens.

According to an aspect of an example embodiment of the disclosure, an image processing system includes an optical lens; a lens driver configured to move the optical lens; an image sensor configured to convert an optical signal transmitted from the optical lens into an electrical signal, to generate image data; and a processor configured to perform image signal processing on the image data, wherein the image sensor includes a pixel array including a plurality of pixels, each of the plurality of pixels includes a color filter, and the color filter includes a first color filter, a second color filter, and a third color filter, respectively configured to transmit light of different wavelengths, and pixels including the first color filter and pixels including the second color filter include at least one phase-detection (PD) pixel, wherein the image data includes a first color channel, a second color channel, and a third color channel, and wherein the processor is further configured to: based on a modeled relationship between a disparity and a position of the optical lens for each of the first color channel and the second color channel, and further based on a position of the optical lens at which sharpness of the third color channel is maximized, determine, for each of the first to third color channels, a movement distance of the optical lens according to the disparity; determine a disparity value and a weight for each of the first color channel and the second color channel from the image data, and apply the disparity value and the weight to the movement distance of the optical lens for each of the first color channel and the second color channel, to determine a final movement distance of the optical lens, and wherein the lens driver is further configured to move the optical lens according to the final movement distance of the optical lens.

According to an aspect of an example embodiment of the disclosure, an image processing system includes an optical lens; a lens driver configured to move the optical lens; and a processor configured to perform image signal processing on image data including a first color channel, a second color channel, and a third color channel, wherein the processor is further configured to: load a first function group including first linear functions that model a relationship between a disparity and a position of the optical lens for each of the first to third color channels, and load position information of the optical lens at which a sharpness of the third color channel is maximized; determine a reciprocal number of a slope of each of the first linear functions as a disparity conversion coefficient for each of the first to third color channels; and determine an offset value for each of the first to third color channels using an X-intercept of each of the first linear functions and the position information; generate, for each of the first to third color channels, second linear functions having the disparity conversion coefficient as a slope and the offset value as a Y-intercept, to generate a second function group; and control the lens driver to move the optical lens according to a final movement distance of the optical lens, which is obtained based on the second function group.

BRIEF DESCRIPTION OF DRAWINGS

The above and other aspects, features, and advantages of the disclosure will be more clearly understood from the following detailed description, taken in conjunction with the accompanying drawings, in which.

DETAILED DESCRIPTION

Hereinafter, one or more example embodiments will be described with reference to the accompanying drawings.

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Figure 1:
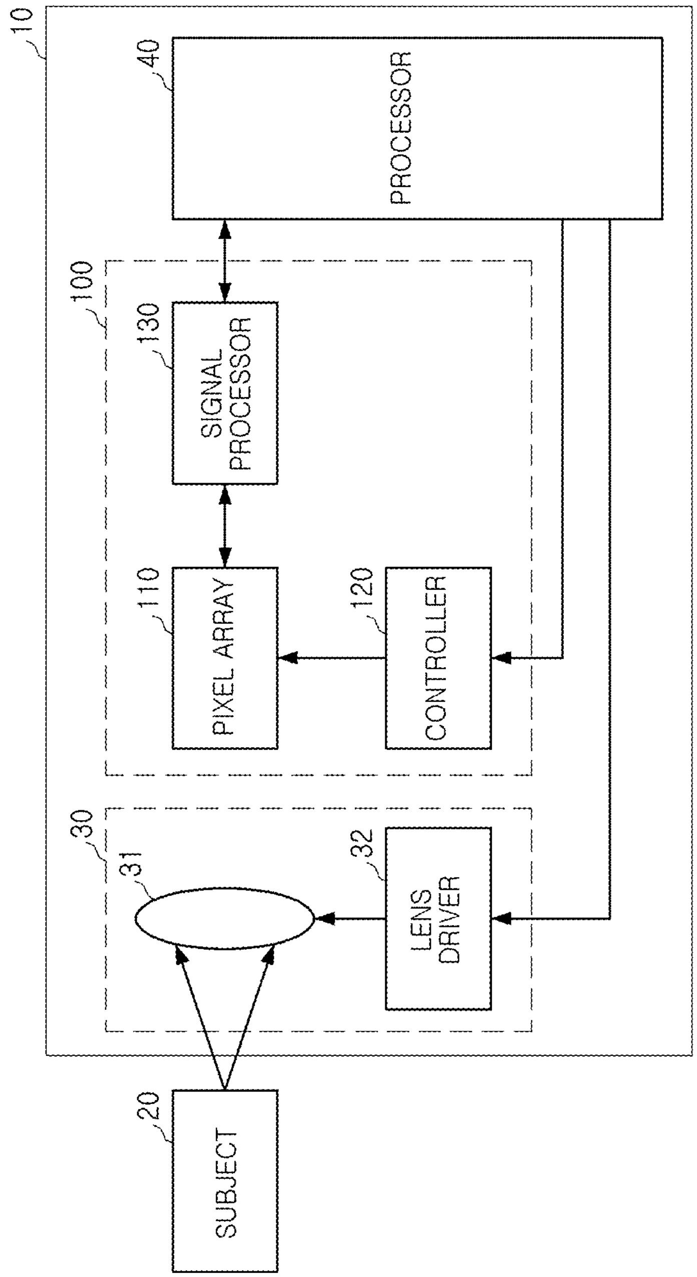
FIG. 1 is a block diagram schematically illustrating an image processing system according to one or more example embodiments.

FIG. 1 is a block diagram schematically illustrating an image processing system according to one or more example embodiments.

An image processing system 10 according to one or more example embodiments may include an image capturing unit 30, an image sensor 100, and a processor 40. The image processing system 10 may have a focus detection function. The image sensor 100 and the image capturing unit 30 may be components included in a camera module (or camera).

The image processing system 10 may be implemented as an electronic device configured to capture an image and display the captured image and/or perform an operation based on the captured image. The image processing system 10 may be implemented as, for example but not limited to, a personal computer (PC), an internet-of-things (IoT) device, or a portable electronic device. The portable electronic device may include, for example but not limited to, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like. In addition, the image processing system 10 may be mounted on an electronic device such as a drone, an advanced driver-assistance system (ADAS), or the like, or an electronic device provided as a component in a vehicle, furniture, manufacturing equipment, a door, various measuring devices, or the like. The image processing system 10 may further include other components such as a display, a user interface, and/or the like. The image processing system 10 may be implemented as a system-on-chip (SoC).

An entire operation of the image processing system 10 may be controlled by the processor 40. The processor 40 may provide a control signal for an operation of each component to a lens driver 32, a controller 120, and/or the like. For example, the image capturing unit 30 may further include an aperture driver (not shown) for driving an aperture, and the processor 40 may provide a control signal for controlling the aperture driver. In an embodiment, the processor 40 may be an application processor (AP).

The image capturing unit 30 may be a component that receives light, and may include an optical lens 31 and a lens driver 32. The optical lens 31 may include a plurality of lenses. The image sensor 100 may convert an optical signal reflected from a subject 20 through the optical lens 31 into an electrical signal, and may generate image data based on the electrical signal. Referring to FIG. 1, the optical lens 31 is illustrated as a single lens, but is not limited thereto. The optical lens 31 may include the plurality of lenses.

The lens driver 32 may receive information about focus detection from the processor 40, and may adjust a position of the optical lens 31 according to the control signal provided from the processor 40. The lens driver 32 may move the optical lens 31 in a direction in which a distance to the subject 20 increases or decreases, and accordingly, a distance between the optical lens 31 and the subject 20 may be adjusted. Depending on the position of the optical lens 31, the subject 20 may be in focus or out of focus.

For example, when the distance between the optical lens 31 and the subject 20 is relatively close to each other, the optical lens 31 may be out of a focus position for focusing on the subject 20, and a phase difference may occur between images captured by the image sensor 100. The processor 40 may detect the phase difference, and may provide a control signal to the lens driver 32, and the lens driver 32 may move the optical lens 31 in a direction in which the distance to the subject 20 increases, based on the control signal provided from the processor 40.

When the distance between the optical lens 31 and the subject 20 is relatively far from each other, the optical lens 31 may be out of a focus position, and a phase difference may occur between images captured on the image sensor 100. The processor 40 may detect the phase difference, and may provide a control signal to the lens driver 32, and the lens driver 32 may move the optical lens 31 in a direction in which the distance to the subject 20 decreases, based on the control signal provided from the processor 40.

The image sensor 100 may include a pixel array 110, the controller 120, and a signal processor 130. The image sensor 100 may convert incident light into an image signal. An optical signal transmitted through the optical lens 31 may reach a light-receiving surface of the pixel array 110, and may form an image of the subject 20.

The pixel array 110 may be a complementary metal oxide semiconductor image sensor (CIS) configured to convert an optical signal into an electrical signal. Sensitivity or the like of such a pixel array 110 may be adjusted by the controller 120. The pixel array 110 may include a plurality of pixels configured to convert the optical signal into the electrical signal. Each of the plurality of pixels may generate a pixel signal according to intensity of detected light.

The image sensor 100 may provide output data to the processor 40. The output data may include phase difference data including phase difference information, or may include image data including phase information such that the processor 40 may perform a phase difference operation.

For example, the phase difference operation performed in the signal processor 130 of the image sensor 100 or performed in the processor 40 may be obtained by performing a correlation operation between image data including different phase information. The processor 40 may obtain a position of focus, a direction of focus, a distance between the subject 20 and the image sensor 100, and/or the like, based on a result of the phase difference operation. The processor 40 may output a control signal to the lens driver 32 for moving a position of the optical lens 31, based on the result of the phase difference operation.

The pixel array 110 may include a color filter configured to transmit light of a predetermined wavelength to sense various colors, and each of the plurality of pixels may sense the light transmitted through the color filter. Therefore, the image sensor 100 may generate output image data including color information. For example, the image sensor 100 may generate output image data of a Bayer pattern.

Figure 2:
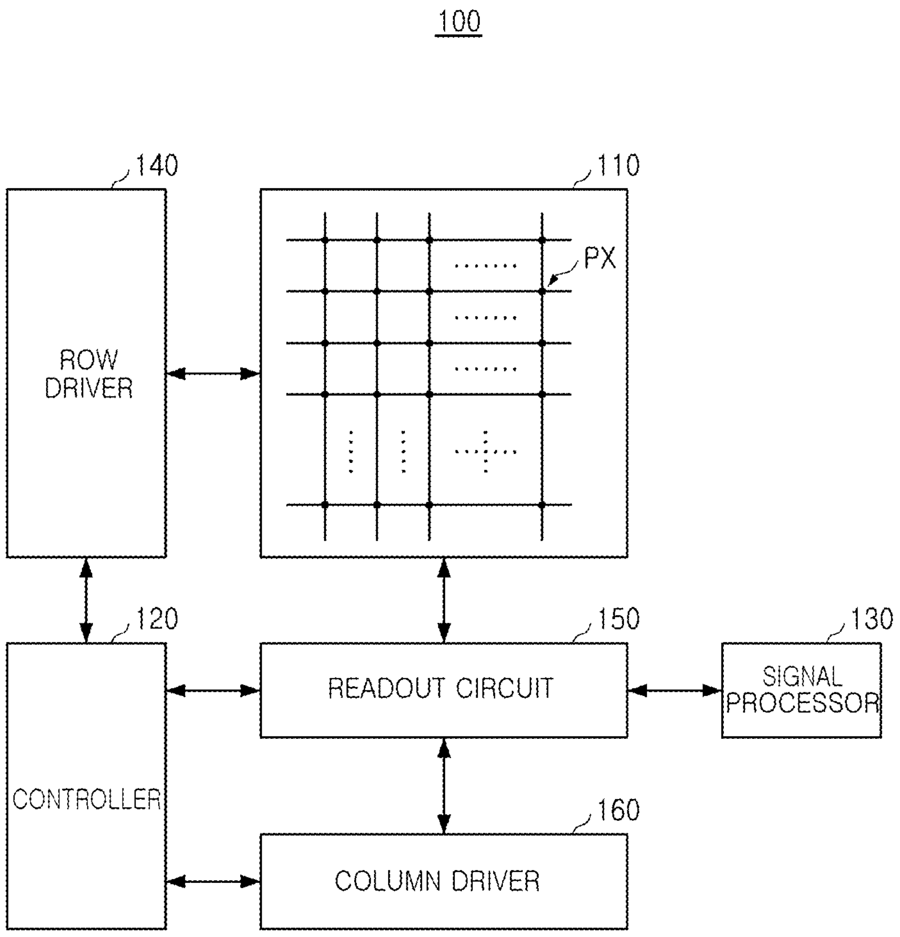
FIG. 2 is a block diagram schematically illustrating an image sensor according to one or more example embodiments.

FIG. 2 is a block diagram schematically illustrating an image sensor according to one or more example embodiments.

Referring to FIG. 2, an image sensor 100 may include a pixel array 110, a controller 120, a signal processor 130, a row driver 140, a readout circuit 150, and a column driver 160.

The readout circuit 150 may include a correlated double sampler (CDS), an analog-to-digital converter (ADC), and/or the like. Correlated double samplers may be connected to a plurality of pixels PX through column lines. The correlated double samplers may read, through the column lines, pixel signals from the plurality of pixels PX connected to a row line selected by a row line select signal of the row driver 140. The analog-to-digital converter may convert the pixel signal detected by the correlated double sampler into a digital pixel signal, and may transmit the digital pixel signal to the column driver 160.

The row driver 140 may generate signals for controlling the pixel array 110, and may provide the signals to the plurality of pixels PX. The row driver 140 may determine activation timings and deactivation timings of reset control signals, transmission control signals, and select signals provided to the plurality of pixels PX.

The column driver 160 may include a latch circuit or a buffer circuit, and an amplifier circuit, and/or the like that may temporarily store the digital pixel signal, and may process the pixel signal received from the readout circuit 150. The row driver 140, the readout circuit 150, and the column driver 160 may be controlled by the controller 120. The controller 120 may include a timing controller configured to control an operation timing of the row driver 140, the readout circuit 150, and the column driver 160, and/or the like.

The controller 120 may control the row driver 140 to cause the pixel array 110 to absorb light to accumulate charges, temporarily store the accumulated charges, and output an electrical signal according to the stored charges to the outside of the pixel array 110. In addition, the controller 120 may control the readout circuit 150 to measure a level of the pixel signal provided by the pixel array 110.

The signal processor 130 may perform signal processing on image data output from the readout circuit 150 to be received. For example, the signal processor 130 may generate phase difference data by calculating a phase difference from image data, and may transmit the phase difference data as the output data to the processor 40 described with reference to FIG. 1. In addition, the signal processor 130 may generate image output data including color information. For example, the signal processor 130 may generate image output data of a Bayer pattern by performing a remosaic processing operation.

The pixel array 110 may convert an optical signal into an electrical signal, and may include the plurality of pixels PX arranged two-dimensionally. Each of the plurality of pixels PX may generate pixel signals according to intensity of detected light. A pixel PX may be implemented as a photoelectric conversion element such as a charge coupled devices (CCD), a complementary metal oxide semiconductor (CMOS), and/or the like, and may also be implemented as various types of photoelectric conversion elements. The pixel array 110 may include a color filter to sense various colors, and each of the plurality of pixels PX may sense a color corresponding thereto.

In an embodiment, the pixel array 110 may include pixel groups and in each pixel group, four pixels may be arranged in two columns and two rows share one micro lens. In an embodiment, the pixel array 110 may include pixel groups, in each of which two adjacently arranged pixels share one micro lens. Each of the pixel groups may include a color filter corresponding thereto.

Among the plurality of pixels PX, pixels PX arranged at the same position in a horizontal direction may share the same column line. For example, pixels PX arranged at the same position in a vertical direction may be simultaneously selected by the row driver 140, and may output pixel signals through the column lines. In an embodiment, the readout circuit 150 may simultaneously obtain pixel signals from pixels PX selected by the row driver 140 through the column lines. The pixel signal may include a reset voltage and a pixel voltage, and the pixel voltage may be a voltage in which charges generated in response to light in each of the pixels PX are reflected in the reset voltage.

In an embodiment, the pixel array 110 may include at least one phase-detection (PD) pixel. The at least one PD pixel may include two or more photodiodes, and a logic circuit may implement an auto-focus function of a camera device including the image sensor 100 by utilizing a difference between pixel signals obtained from the two or more photodiodes included in each of the at least one PD pixel.

Figure 3:
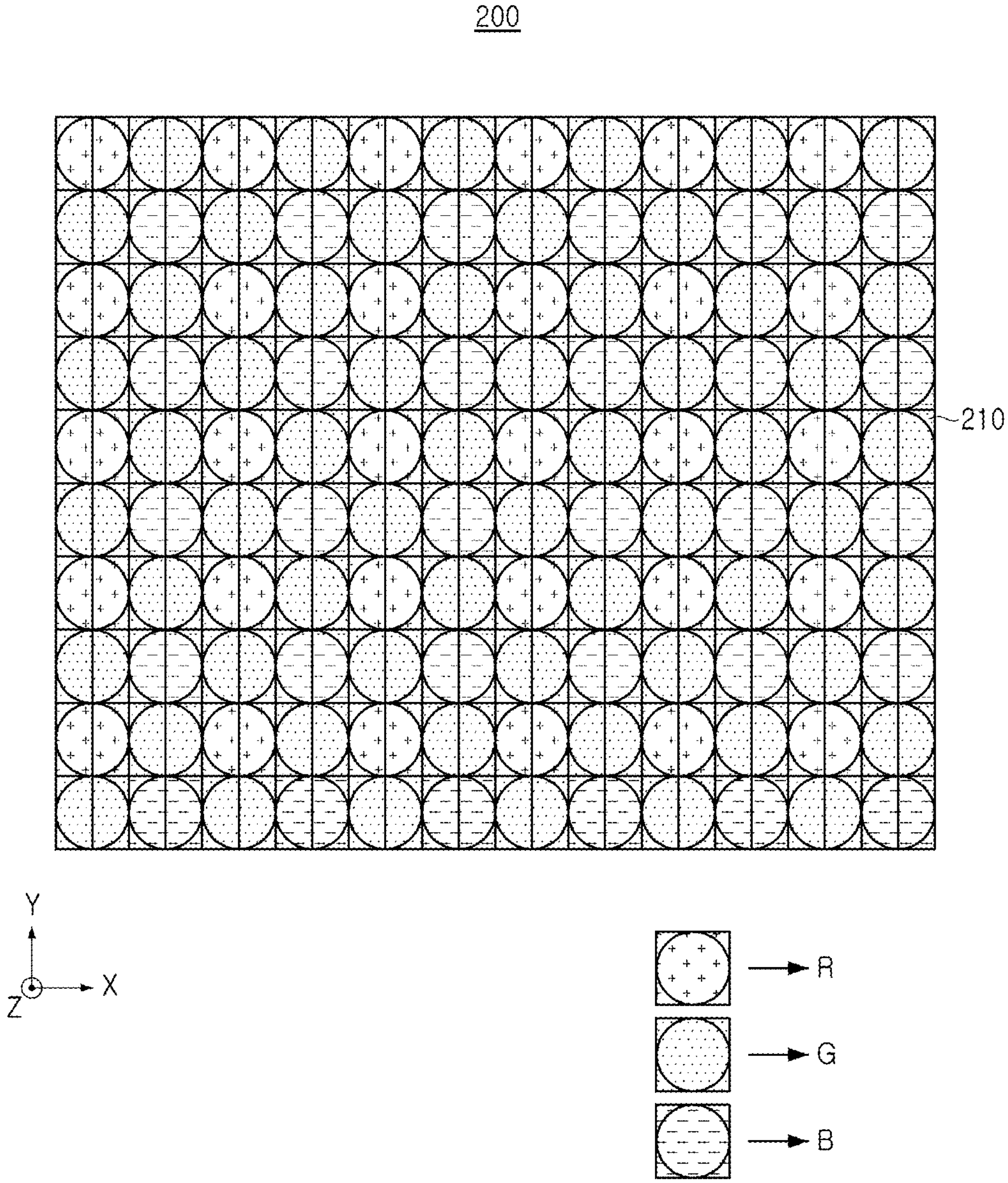
FIG. 3 is a view schematically illustrating a pixel array included in an image sensor according to one or more example embodiments.

FIG. 3 is a view schematically illustrating a pixel array included in an image sensor according to one or more example embodiments.

Referring to FIG. 3, a pixel array 200 may include a plurality of pixels 210 arranged in a first direction (e.g., X-axis direction) and a second direction (e.g., Y-axis direction), and each of the plurality of pixels 210 may include a first photodiode and a second photodiode. Each of the pixels 210 included in the pixel array 200 may be a PD pixel. The PD pixel may include a first photodiode and a second photodiode. The first photodiode and the second photodiode included in the PD pixel may be arranged in the first direction (X), and the first photodiode and the second photodiode may share a micro lens (e.g., one micro lens). According to one or more example embodiments, some of the PD pixels may have the first photodiode and the second photodiode, arranged in a direction different from the first direction (X), for example, in the second direction (Y).

In an embodiment, a processor may load information about a movement distance of an optical lens according to a disparity value of each color channel. The first photodiode included in the PD pixel may output first image data, and the second photodiode may output second image data. The first image data may include first phase information, and the second image data may include second phase information. A difference between the first phase information and the second phase information may be the disparity value. When the processor applies a disparity value calculated from the PD pixel to a function that models a relationship between the movement distance of the optical lens and a disparity value for each of a first channel, a second channel, and a third channel, a movement distance of the optical lens may be determined.

Figure 4:
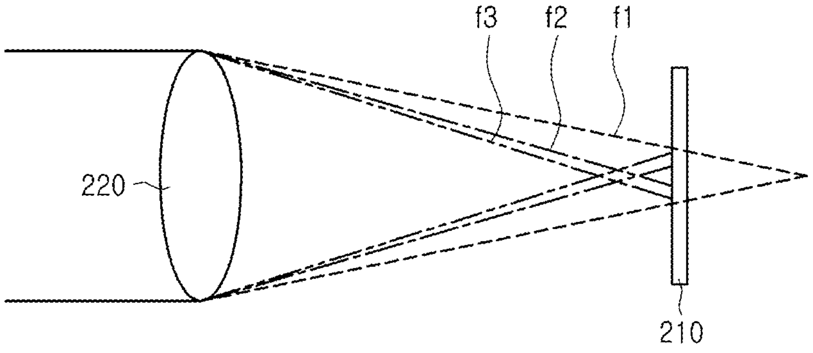
FIG. 4 is a view schematically illustrating an image processing system according to one or more example embodiments.

FIG. 4 is a view schematically illustrating an image processing system according to one or more example embodiments.

An imaging device may include a plurality of optical lenses 220. Each of the optical lenses 220 may include a material having a different refractive index from a medium outside the optical lens 220. By making a refractive index and a surface curvature of the optical lenses 220 different from, those of the medium outside the optical lenses 220, a path of light passing through the optical lenses 220 may be controlled. By appropriately controlling shapes of the optical lenses 220 and a space between the optical lenses 220, light passing through the imaging device may form a focus point on an imaging surface. FIG. 4 illustrates one optical lens 220. The optical lens 220 may correspond to the optical lens 31 of FIG. 1. The number of optical lenses 220 included in the imaging device may not be limited thereto, and the imaging device may include a plurality of optical lenses.

When the optical lens 220 is of a refractive index type, chromatic aberration may occur because a refractive index of light may be different depending on a wavelength of the light. In particular, longitudinal chromatic aberration may occur, in which a focus of light divided in a direction, perpendicular to a surface of the pixel 210, is changed.

Referring to FIG. 4, when light passes through the optical lens 220 that generates chromatic aberration, a focal length in a direction, perpendicular to a surface of the pixel 210, may be changed, depending on a refractive index of the light. In an embodiment, the light passing through the optical lens 220 may be dispersed into red light f1, green light f2, and blue light f3. A focal length of the red light f1, a focal length of the green light f2, and a focal length of the blue light f3 may be different from each other. For example, since the red light f1 has a relatively long wavelength and thus a relatively small refractive index, the focal length of the red light f1 may be relatively long. Since the blue light f3 has a relatively short wavelength and thus a relatively large refractive index, the focal length of the blue light f3 may be relatively short. Since the green light f2 has a wavelength that may be intermediate between the red light f1 and the blue light f3, the focal length of the green light f2 may be intermediate between the focal length of the red light f1 and the focal length of the blue light f3.

The following Equation 1 represents a linear function (PD_Y) modeled using a product of ratios α, β, and γ of each of first to third color channels included in a pixel array and first phase information (e.g., left phase) and second phase information (e.g., right phase) for each of the first to third color channels. In the optical lens 220 that generates chromatic aberration, when a processor performs calibration using a modelling function (PD_Y) as an average value of phase differences of the first to third color channels, an actual focal position of the first to third color channels may be different from a focal position calculated by the modelling function (PD_Y). In particular, the focal position calculated from the modelling function (PD_Y) may be different from a focal position of the green channel, which has a relatively high impact on resolution.

[Equation 1]

$$Y_l = \alpha(\text{Red left phase}) + \beta(\text{Green left phase}) + \gamma(\text{Blue left phase})$$

$$Y_r = \alpha(\text{Red right phase}) + \beta(\text{Green right phase}) + \gamma(\text{Blue right phase})$$

$$PD_Y = Y_l + Y_r$$

According to one or more example embodiments, the processor may perform calibration for the first color channel, calibration for the second color channel, and calibration for the third color channel, to generate a first function group that model a relationship between disparity and a position of an optical lens for each of the first to third color channels. The processor may convert the first function group into a second function group that model a relationship of a movement distance of the optical lens according to disparity for each of the first to third color channels. In an embodiment, the third color channel may be a green channel. The processor may convert the first function group into the second function group, based on a position of the optical lens at which sharpness of the green channel is maximized. The conversion process will be described in detail in FIGS. 5A to 7 later.

The processor may determine a disparity conversion coefficient (DCC) for each of the first to third color channels. The disparity conversion coefficient of each of the first to third color channels may be a slope of each graph included in the second function group. The disparity conversion coefficient may be determined using the first function group modeled using information about the disparity of each of the first to third color channels and the position of the optical lens, acquired in advance. The second function group may include an offset value. The offset value may mean the movement distance of the optical lens when the disparity is 0 in the first to third color channels.

According to one or more example embodiments, the processor may obtain a final movement distance of the optical lens by substituting the disparity value, the disparity conversion coefficient, and the offset value for each of the first to third color channels into the second function group. The final movement distance of the optical lens may be determined by performing a weighted sum on the movement distance of the optical lens for each of the first to third color channels. Based on image data output from an image sensor, a weight may be calculated using at least one of a ratio of the first color channel and the third color channel, a ratio of the second color channel and the third color channel, and a white balance gain, included in the image data. By performing the calibration for each of the first to third color channels, performing the weighted sum on the movement distance of the optical lens for each of the first to third color channels, and determining the final movement distance of the optical lens focused on the third color channel, resolution of an image generated by the imaging device including the optical lens, in which chromatic aberration occurs, may be improved.

FIGS. 5A to 7 are views schematically illustrating a process of obtaining a final movement distance of an optical lens according to one or more example embodiments.

A pixel array according to one or more example embodiments may include a plurality of pixels. Each of the plurality of pixels may include a color filter. The color filter may include a first color filter configured to selectively transmit light of a first wavelength, a second color filter configured to selectively transmit light of a second wavelength, and a third color filter configured to selectively transmit light of a third wavelength. In an embodiment, the first color filter may be a red filter, the second color filter may be a blue filter, and the third color filter may be a green filter. Each of the plurality of pixels may be a PD pixel. Each of the plurality of pixels may include a first photodiode and a second photodiode.

A processor according to one or more example embodiments may perform calibration for a first color channel, calibration for a second color channel, and calibration for a third color channel. Calibration may refer to a process of obtaining a position of the lens in advance according to a disparity value of the PD pixel. The disparity value may mean a difference between a phase obtained from the first photodiode and a phase obtained from the second photodiode, in the PD pixel.

Figure 5A:
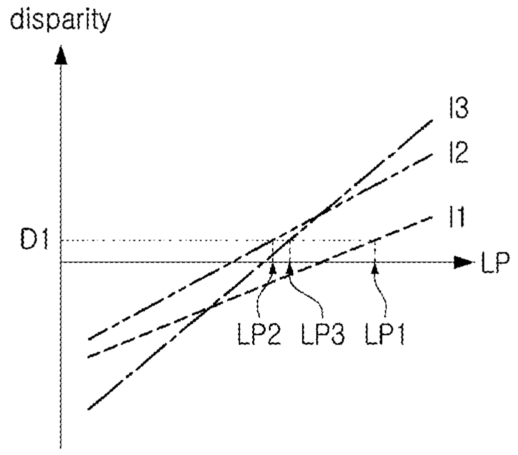
FIGS. 5A, 5B, 6A, 6B, and 7 are views schematically illustrating a process of obtaining a final movement distance of an optical lens according to one or more example embodiments.

A processor according to one or more example embodiments may load a first function group that model a relationship of disparity according to the position of the optical lens for each of the first to third color channels in advance. FIG. 5A illustrates graphs of the first function group on an X-axis indicating a position LP of an optical lens and a Y-axis indicating disparity. Referring to FIG. 5A, graphs of the first function group may include a graph l1 that models a relationship of disparity according to the position LP of the optical lens for the first color channel, a graph l2 that models a relationship of disparity according to the position LP of the optical lens for the second color channel, and a graph l3 that models a relationship of disparity according to the position LP of the optical lens for the third color channel.

A disparity conversion coefficient for each of the first to third color channels may be obtained from the first function group. A reciprocal number of a slope of each of the graphs l1, l2, and l3 may be a disparity conversion coefficient. The disparity conversion coefficient may be different for each of the first to third color channels. Since the disparity conversion coefficient is different for each of the first to third color channels, even when a disparity value is the same for the first to third color channels, the positions LP of the optical lenses that may be in focus may be different for each color channel of the first to third color channels. For example, when a disparity value is D1 for each of the first to third color channels, the position LP of the optical lens in focus for the first color channel may be LP1, the position LP of the optical lens in focus for the second color channel may be LP2, and the position LP of the optical lens in focus for the third color channel may be LP3.

Since the disparity conversion coefficient is different for each of the first to third color channels, even when the position of the optical lens is the same, the disparity values may be different from each other. For example, when the position LP of the optical lens is LP1 for the first to third color channels, the disparity value may be different for each of the first color channel, the second color channel, and the third color channel.

The third color channel may have a relatively large influence on determining resolution of an image generated by an imaging device. The imaging device may include an image sensor including a pixel array. The pixel array may include a plurality of pixels arranged in a Bayer pattern. The plurality of pixels may include a red filter, a blue filter, and a green filter that each transmit light of different wavelengths. For example, a ratio of a red channel, a blue channel, and a green channel, included in the pixel array, may be 1:1:2. Since a ratio of the green channel among the plurality of pixels may be higher than a ratio of the red channel and the blue channel, a focal position of the green channel may have a relatively large influence on the resolution of the image generated by the imaging device, as compared to the red channel or the blue channel. In addition, since a human eye may include three color receptors, and a wavelength of green light may activate two of the three color receptors, the green light may be relatively sensitive to the human eye. In an embodiment, the resolution of the image generated by the imaging device may be improved by arranging the optical lens at a focal length of the green channel.

Figure 5B:
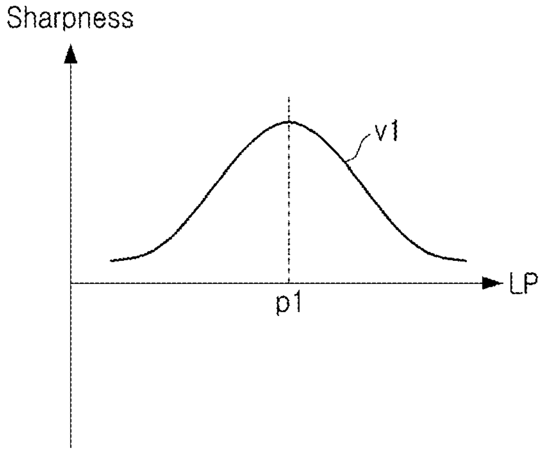

Referring to FIG. 5B, a processor according to one or more example embodiments may load information about a position LP of an optical lens at which sharpness of the third color channel is maximized. The Information about the position LP of the optical lens at which sharpness of the third color channel is maximized may be modeled as a graph v1. The position of the optical lens at which sharpness of the third color channel is maximized may be p1. When the position LP of the optical lens is p1, sharpness of the third color channel may be maximized, and the imaging device may generate an image having improved resolution.

A processor according to one or more example embodiments may convert a first function group that model a relationship between disparity and a position of an optical lens for each of first to third color channels into a second function group that model a relationship between a movement distance of the optical lens and disparity for each of the first to third color channels. When converting from the first function group to the second function group, the first function group may be converted to the second function group based on information about the position LP of the optical lens in which sharpness of the third color channel is maximized.

Figure 6A:
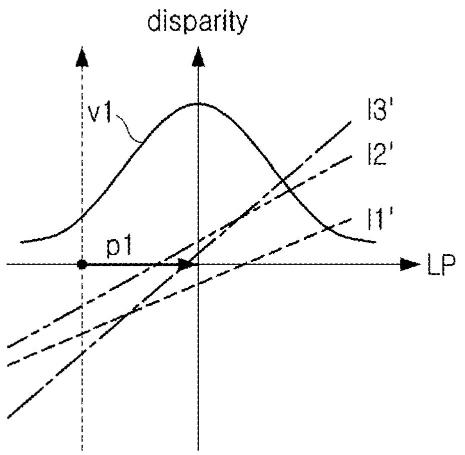

Referring to FIG. 6A, to convert a first function group to a second function group based on information regarding a position LP of an optical lens at which sharpness of a third color channel is maximized, a Y-axis of graphs of the first function group may be moved to p1, which may be a position of the optical lens at which sharpness of the third color channel is maximized. By moving the Y-axis of the first function group, new graphs l1', l2', and l3' in which the position p1 of the optical lens at which sharpness of the third color channel is maximized, serves as an origin, may be obtained.

Figure 6B:
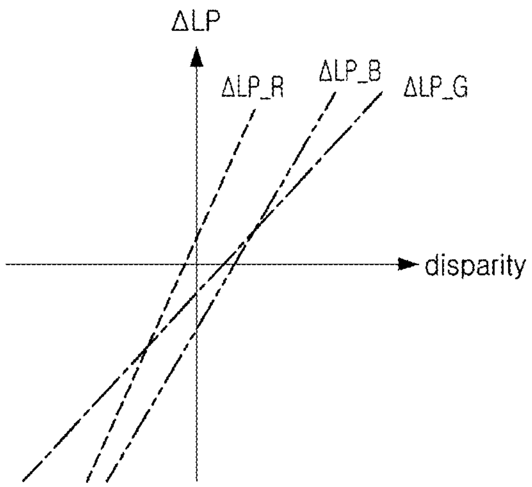

Referring to FIG. 6B, a processor according to one or more example embodiments may load a second function group that model a relationship between a movement distance of an optical lens according to disparity for each of first to third color channels. Referring to FIGS. 6A and 6B together, when conversion between an X-axis and a Y-axis in graphs l1', l2', and l3', illustrated in FIG. 6A, is performed, the second function group including graphs ΔLP_R, ΔLP_G, and ΔLP_B, illustrated in FIG. 6B, may be determined. FIG. 6B illustrates graphs of the second function group wherein an X-axis represents the disparity and a Y-axis represents the movement distance ΔLP of the optical lens.

A processor according to one or more example embodiments may load a disparity conversion coefficient for each of the first to third color channels. The disparity conversion coefficient for each of the first to third color channels may be different from each other. The disparity conversion coefficient for each of the first to third color channels may be obtained from slopes of graphs ΔLP_R, ΔLP_G, and ΔLP_B, included in the second function group. For example, a first disparity conversion coefficient for the first color channel may be the slope of the graph ΔLP_R, a second disparity conversion coefficient for the second color channel may be the slope of the graph ΔLP_B, and a third disparity conversion coefficient for the third color channel may be the slope of the graph ΔLP_G. Referring to FIG. 5A, a reciprocal number of the slope of each of graphs l1, l2, and l3, included in the first function group, may be equal to the disparity conversion coefficient for each of the first to third color channels.

A processor according to one or more example embodiments may load information about an offset value of the optical lens for each of the first to third color channels. In the second function group, the offset value may be the movement distance ΔLP of the optical lens, when the disparity is 0. Offset values for each of the first to third color channels may be different from each other. Referring to FIGS. 5A and 5B, the offset value may be determined according to the position LP of the lens when the disparity is 0 in the first function group and the position LP of the optical lens at which sharpness of the third color channel is maximized.

The following Equation 2 represents a function in which a movement distance ΔLP_R of a lens for focusing in a first color channel has a first disparity conversion coefficient DCC_R as a slope, disparity disp(PD_Y) in the first color channel as a variable X, and an offset value o_R as a Y-intercept. A movement distance ΔLP_B of the lens for focusing in a second color channel and a movement distance ΔLP_G of the lens for focusing in a third color channel may also be expressed in a similar manner as above. Disparity values for each of the first to third color channels may be calculated from image data output from an image sensor. In order for the processor to calculate the disparity values, the disparity conversion coefficient and offset for each of the first to third color channels may be determined in advance, and may be loaded into the processor in advance.

$$\Delta LP_R = DCC_R * disp(PD_Y) + o_R \quad \text{[Equation 2]}$$

$$\Delta LP_G = DCC_G * disp(PD_Y) + o_G$$

$$\Delta LP_B = DCC_B * disp(PD_Y) + o_B$$

Figure 7:
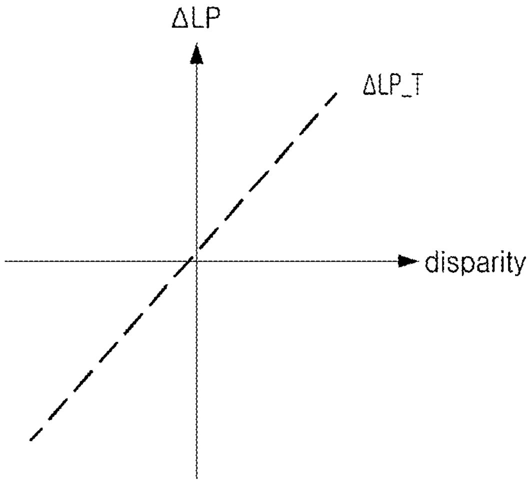

Referring to FIG. 7, a processor according to one or more example embodiments may determine a final movement distance ΔLP_T of an optical lens by weighting movement distances ΔLP_R, ΔLP_G, and ΔLP_B of the optical lens according to disparity for each of first to third color channels.

A processor according to one or more example embodiments may apply weights $W_R$, $W_B$, and $1-W_R-W_B$ to each of the movement distances ΔLP_R, ΔLP_B, and ΔLP_G of the optical lens according to the disparity for each of the first to third color channels. Referring to the following Equation 3, the weights $W_R$, $W_B$, and $1-W_R-W_B$ may be determined using at least one of a ratio of the first color channel and the third color channel (R/G), a ratio of the second color channel and the third color channel (B/G), and a white balance gain (WBgain) that may be obtained from image data output from an image sensor.

White balance may refer to a function that corrects a color temperature of light through a system software, a lighting environment, or a display device, included in an imaging device, to capture an ideal white. White balance gain may refer to a gain corrected by the first to third color channels of the image data to represent a white color, when the white color is captured in the imaging device.

[Equation 3]

$$\Delta LP_T = W_R(DCC_R * disp(PD_Y) + o_R) + W_B(DCC_B * disp(PD_Y) + o_B) + (1 - W_R - W_B)(DCC_G * disp(PD_Y) + o_G)$$

$$W_R = F\left(\frac{R}{G}, \frac{B}{G}, WBgain\right)$$

$$W_B = G\left(\frac{R}{G}, \frac{B}{G}, WBgain\right)$$

In an embodiment, an image sensor may output one image per frame cycle. For example, an image sensor may output first image data and second image data at different frame cycles. The first image data and the second image data may not be the same image data. The first image data and the second image data may include the first color channel, the second color channel, and the third color channel, respectively. Since the first image data and the second image data may not be the same image data, a white balance gain (WBgain) included in each of the image data may be different. Therefore, weights for the first to third color channels for the first image data may be different from weights for the first to third color channels for the second image data.

Referring to FIG. 7, a processor according to one or more example embodiments may determine the final movement distance ΔLP_T of the optical lens. The final movement distance ΔLP_T of the optical lens may be a value obtained by adding a product of the weight $W_R$ of the first color channel and the lens movement distance ΔLP_R according to the disparity of the first color channel, a product of the weight $W_B$ of the second color channel and the lens movement distance ΔLP_B according to the disparity of the second color channel, and a product of the weight $1-W_R-W_B$ of the third color channel and the lens movement distance ΔLP_G according to the disparity of the third color channel. The final movement distance ΔLP_T of the optical lens may also be modeled as a linear function. Referring to Equation 3, when determining the final movement distance ΔLP_T of the optical lens, disparity conversion coefficients DCC_R, DCC_B, and DCC_G and offset values o_R, o_B, and o_G for each of the first to third color channels may be information loaded in advance, and the disparity value disp(PD_Y) and the weights $W_R$, $W_B$, and $1-W_R-W_B$ for each of the first to third color channels may be calculated as information included in the image data output from the image sensor.

Figure 8:
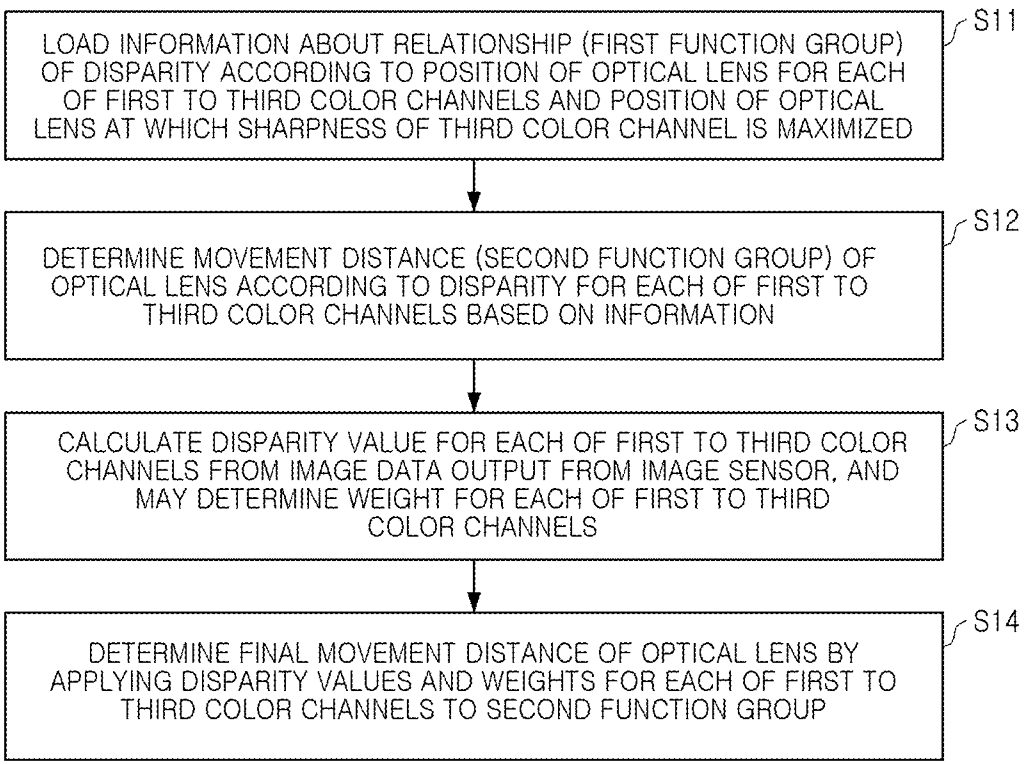
FIG. 8 is a flowchart illustrating a process of obtaining a final movement distance of an optical lens according to one or more example embodiments.

FIG. 8 is a flowchart illustrating a process of obtaining a final movement distance of an optical lens according to one or more example embodiments.

A processor according to one or more example embodiments may pre-load information about a relationship (first function group) of disparity according to a position of an optical lens for each of first to third color channels and information about a position of the optical lens at which sharpness of the third color channel is maximized (S11). In an imaging device including the optical lens that generates chromatic aberration, even when a position of the optical lens is the same, a disparity value of each of the first to third color channels is different from each other. In a process of producing the imaging device, the first function group that models the relationship of the disparity according to the position of the optical lens that generates the chromatic aberration for each of the first to third color channels and information about the position of the optical lens at which sharpness of the third color channel is maximized, may be determined in advance. The information about the first function group and the position of the optical lens may be loaded into the processor.

A processor according to one or more example embodiments may determine a movement distance (second function group) of the optical lens according to the disparity for each of the first to third color channels (S12). Graphs included in the first function group may move, based on the position of the optical lens at which sharpness of the third color channel is maximized, and conversion between an X-axis and a Y-axis of the graphs included in the first function group, which have been moved, may be performed, to determine the second function group that models a relationship of the movement distance of the optical lens according to the disparity for each of the first to third color channels. A graph included in the second function group may include a disparity conversion coefficient and an offset value for each of the first to third color channels.

A processor according to one or more example embodiments may extract the disparity value for each of the first to third color channels from image data output from the image sensor, and may determine a weight for each of the first to third color channels (S13). The disparity value for each of the first to third color channels, which may be a phase difference, may be extracted from first image data and second image data, output from a first photodiode and a second photodiode, included in each of the first to third color channels. In addition, the weight for each of the first to third color channels may be determined using at least one of a ratio of the first color channel and the third color channel, a ratio of the second color channel and the third color channel, and a white balance gain.

A processor according to one or more example embodiments may determine a final movement distance of the optical lens by applying the disparity values and respective weights for the first to third color channels to the second function group (S14). The movement distance of the optical lens for each of the first to third color channels may be determined by multiplying the disparity conversion coefficient and the disparity value for each of the first to third color channels, and adding an offset value thereto. The final movement distance of the optical lens may be determined by weighting the movement distance of the optical lens for each of the first to third color channels.

According to the embodiment described with reference to FIGS. 4 to 8, when the optical lens has chromatic aberration according to a wavelength of light, the movement distance of the optical lens according to disparity of each of the plurality of color channels may be determined, based on a position of the optical lens at which sharpness of a target color channel, for example, a green channel, which has the greatest influence on resolution of an image.

According to the embodiment, even when the target color channel does not include a PD pixel, resolution of an image may be improved by determining the movement distance of the optical lens according to the disparity of each of the color channels including the PD pixel, based on the position of the optical lens at which sharpness of the target color channel is maximized. Hereinafter, a method for determining a movement distance of an optical lens according to one or more example embodiments will be described in detail with reference to FIGS. 9 to 13.

Figure 9:
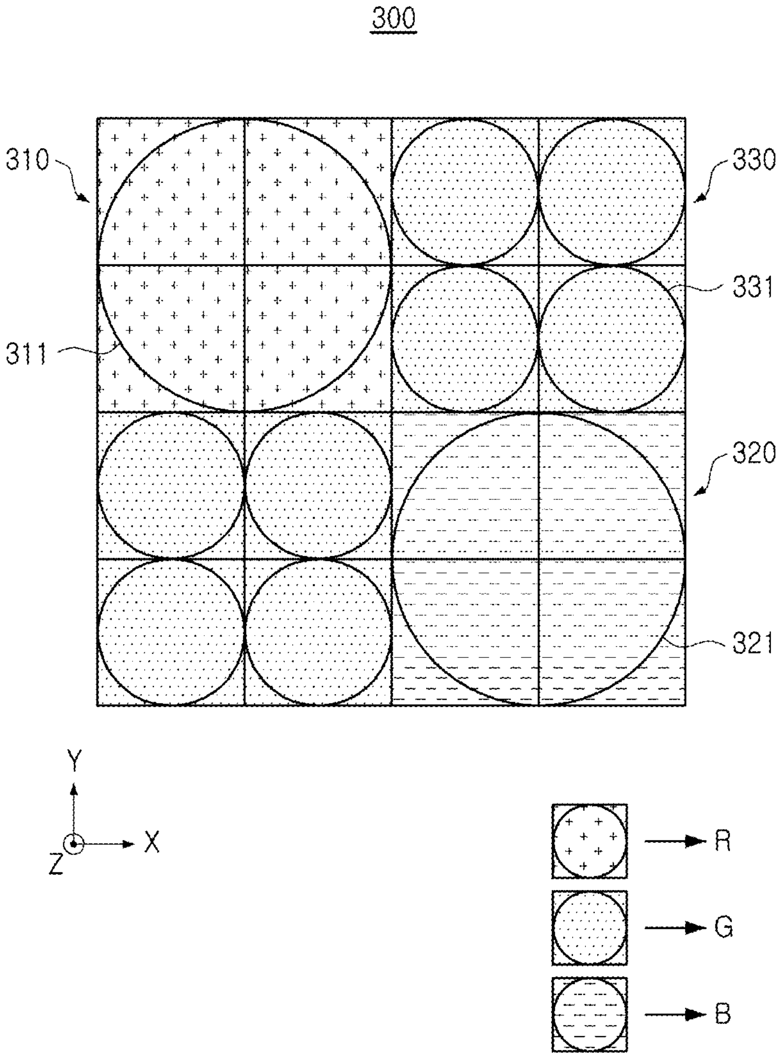
FIGS. 9 and 10 are views illustrating a portion of a pixel array included in an image sensor according to one or more example embodiments.
Figure 10:
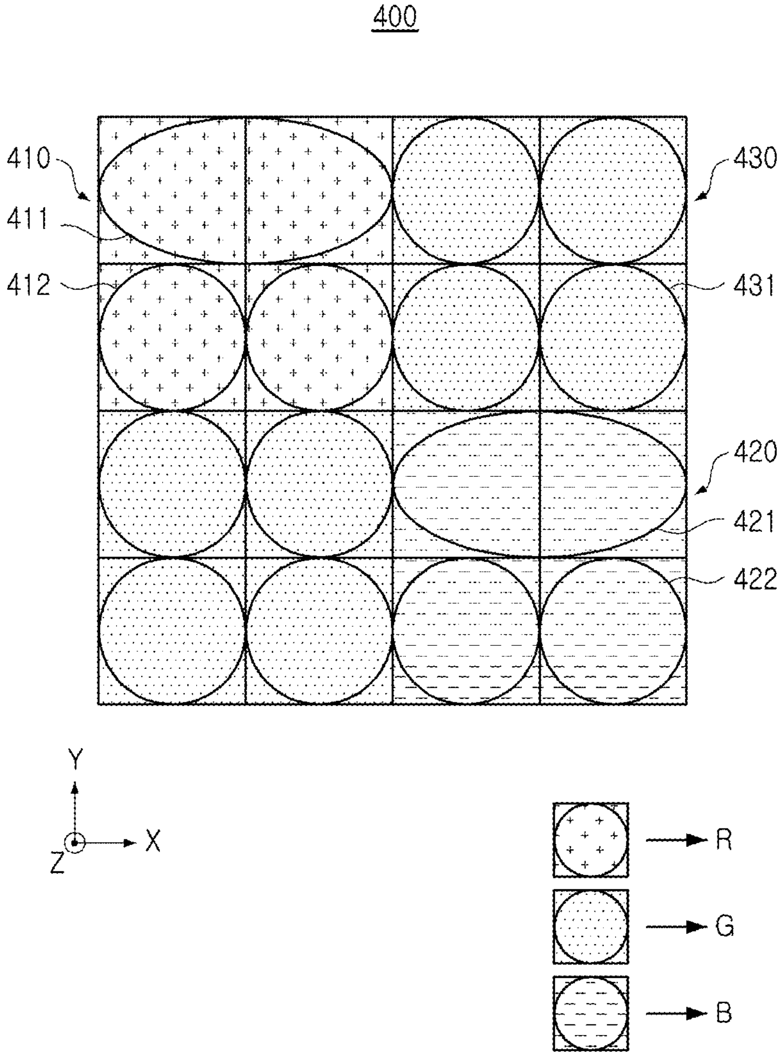

FIGS. 9 and 10 are views illustrating a portion of a pixel array included in an image sensor according to one or more example embodiments.

A pixel array according to one or more example embodiments may include a plurality of pixels. Each of the plurality of pixels may include a color filter and a micro lens. The color filter may include a first color filter configured to selectively transmit light of a first wavelength, a second color filter configured to selectively transmit light of a second wavelength, and a third color filter configured to selectively transmit light of a third wavelength. Pixels including the first and second color filters may include at least one PD pixel, and pixels including the third color filter may not include a PD pixel.

Pixels of a first color channel and a second color channel may include at least one PD pixel, such that two or more photodiodes included in the PD pixel may be used to quickly focus. Pixels of a third color channel may not include a PD pixel to increase resolution. Therefore, a PDAF function may be performed using the pixels of the first and second color channels, and resolution of an image may be improved using the pixels of the third color channel.

Referring to FIG. 9, four unit pixels having a first color filter may form a first pixel group 310. Four unit pixels having a second color filter may form a second pixel group 320. In each of the first pixel group 310 and the second pixel group 320, the four unit pixels may share one micro lens (311 and 321). Four unit pixels having a third color filter may form a third pixel group 330. Each of the unit pixels included in the third pixel group 330 may include a micro lens 331. In an embodiment, one first pixel group 310, one second pixel group 320, and two third pixel groups 330 may be arranged in a Bayer pattern in a pixel array. In an embodiment, the first color filter may be a red filter, the second color filter may be a blue filter, and the third color filter may be a green filter.

A processor according to one or more example embodiments may load information about a relationship of disparity according to a position of an optical lens for each of first and second color channels, and information about a position of the optical lens at which sharpness of the third color channel is maximized. Since pixels of the first color channel and the second color channel include at least one PD pixel, a disparity value may be calculated, and thus a function that models the relationship of disparity according to the position of the optical lens for each of the first and second color channels may be loaded into the processor. Information about the position of the optical lens at which sharpness of the third color channel is maximized may be loaded into the processor from pixels of the third color channel not including the PD pixel.

According to one or more example embodiments, since a movement distance of the optical lens may be determined based on the position of the optical lens at which sharpness of the third color channel is maximized, resolution of an image may be improved.

Referring to FIG. 10, a pixel array according to one or more example embodiments may include a plurality of unit pixels. Each of the plurality of unit pixels may include a color filter and a micro lens. The color filter may include a first color filter configured to selectively transmit light of a first wavelength, a second color filter configured to selectively transmit light of a second wavelength, and a third color filter configured to selectively transmit light of a third wavelength. Pixels including the first and the second color filters may include at least one PD pixel, and pixels including the third color filter may not include a PD pixel.

Four unit pixels having the first color filter may form a first pixel group 410. Four unit pixels having the second color filter may form a second pixel group 420. Two unit pixels among the four unit pixels included in the first pixel group 410 and the second pixel group 420 may share one micro lens (411 and 421), and each of remaining two unit pixels may include one micro lens (412 and 422). Four unit pixels having the third color filter may form a third pixel group 430. Each of the four unit pixels included in the third pixel group 430 may include a micro lens 431. In an embodiment, one first pixel group 410, one second pixel group 420, and two third pixel groups 430 in the pixel array may be arranged in a Bayer pattern. In an embodiment, the first color filter may be a red filter, the second color filter may be a blue filter, and the third color filter may be a green filter.

FIGS. 11A to 13 are views schematically illustrating a process of obtaining a movement distance of an optical lens according to one or more example embodiments.

A pixel array according to one or more example embodiments may include a plurality of pixels. Each of the plurality of pixels may include a color filter. The color filter may include a first color filter configured to selectively transmit light of a first wavelength, a second color filter configured to selectively transmit light of a second wavelength, and a third color filter configured to selectively transmit light of a third wavelength. In an embodiment, the first color filter may be a red filter, the second color filter may be a blue filter, and the third color filter may be a green filter. Pixels including the first color filter and the second color filter may include at least one PD pixel. Each of the at least one PD pixel may include a first photodiode and a second photodiode.

A processor according to one or more example embodiments may perform calibration for a first color channel, and calibration for a second color channel. A processor according to one or more example embodiments may load a first function group that models a relationship of disparity according to a position of an optical lens for each of the first and second color channels in advance.

Figure 11A:
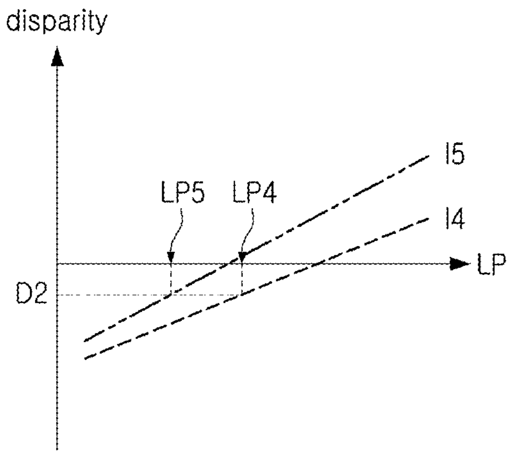
FIGS. 11A, 11B, 12A, 12B, and 13 are views schematically illustrating a process of obtaining a movement distance of an optical lens according to one or more example embodiments.

Referring to FIG. 11A, graphs of the first function group may include a graph 14 that models a relationship of disparity according to a position LP of an optical lens for the first color channel, and a graph 15 that models a relationship of disparity according to the position LP of the optical lens for the second color channel.

A disparity conversion coefficient for each of the first and second color channels may be obtained from the first function group. A reciprocal number of a slope of each of the graphs 14 and 15 may correspond to a disparity conversion coefficient. The disparity conversion coefficient may be different for each of the first and second color channels. Since the disparity conversion coefficient may be different for each of the first and second color channels, even when a disparity value is the same for the first and second color channels, the positions LP of the optical lenses that may be in focus may be different for each color channel. For example, when a disparity value is D2 for each of the first and second color channels, the position LP of the optical lens in focus for the first color channel may be LP4, and the position LP of the optical lens in focus for the second color channel may be LP5.

Since the disparity conversion coefficients is different for each of the first and second color channels, even when the positions of the optical lenses is the same, the disparity values may be different for each color channel. For example, when the position LP of the optical lens is LP4 for each of the first and second color channels, the disparity value may be different for each of the first and second color channels.

Since a proportion of pixels corresponding to the third color channel among the plurality of pixels may be the highest and sensitivity of green light may be the highest, the third color channel may have a relatively large influence on determining resolution of an image generated by an imaging device. According to one or more example embodiments, the resolution of the image generated by the imaging device may be improved by arranging the optical lens at a focal length of a green channel.

Figure 11B:
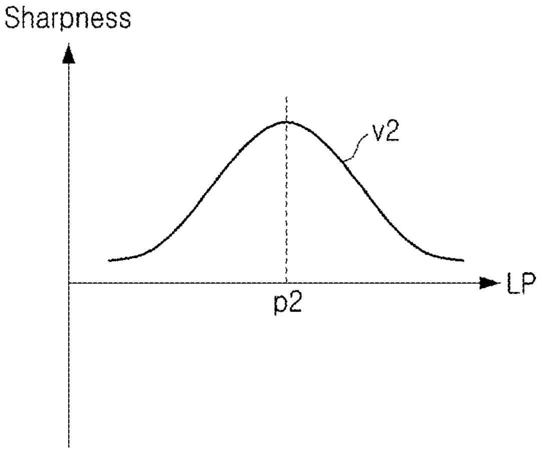

Referring to FIG. 11B, a processor according to one or more example embodiments may load information about a position LP of an optical lens at which sharpness of a third color channel is maximized. Even when there is no PD pixel in the third color channel, a graph v2 representing the information about the position LP of the optical lens at which sharpness of the third color channel is maximized may be modeled. The position of the optical lens LP at which sharpness of the third color channel is maximized may be p2. When the position LP of the optical lens is p2, sharpness of the third color channel may be maximized, and the imaging device may generate an image having a relatively high resolution.

A processor according to one or more example embodiments may convert a first function group that models a relationship of disparity according to a position of an optical lens for each of first and second color channels into a second function group that models a relationship of a movement distance of the optical lens according to disparity for each of the first and second color channels. When converting from the first function group to the second function group, the first function group may be converted into the second function group based on information about the position LP of the optical lens at which sharpness of the third color channel is maximized.

Figure 12A:
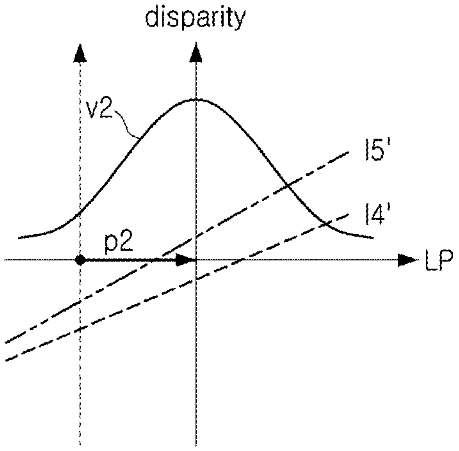

Referring to FIG. 12A, to convert a first function group to a second function group based on information about a position LP of an optical lens at which sharpness of a third color channel is maximized, an Y-axis of graphs of the first function group may be moved to p2, which may be a position of the optical lens at which sharpness of the third color channel is maximized. By moving the Y-axis of the first function group, new graphs 14' and 15' in which the position p2 of the optical lens at which sharpness of the third color channel is maximized, serves as an origin, may be obtained.

Figure 12B:
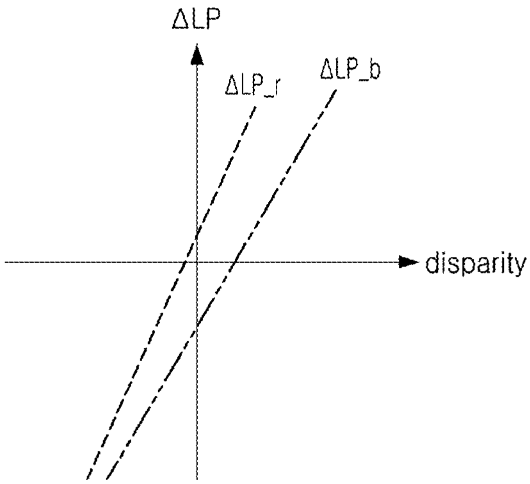

Referring to FIG. 12B, a processor according to one or more example embodiments may load a second function group that models a relationship between a movement distance of an optical lens according to disparity for each of first and second color channels. Referring to FIGS. 12A and 12B together, when conversion between an X-axis and a Y-axis in graphs 14' and 15', illustrated in FIG. 12A, is performed, the second function group including graphs ΔLP_r and ΔLP_b, illustrated in FIG. 12B, may be determined. An X-axis of the second function group may be the disparity, and a Y-axis may be the movement distance ΔLP of the optical lens.

A processor according to one or more example embodiments may determine a disparity conversion coefficient for each of the first and second channels. The disparity conversion coefficients for each of the first and second color channels may be different from each other. The disparity conversion coefficients for each of the first and third color channels may be obtained from slopes of graphs ΔLP_r and ΔLP_b, included in the second function group.

A processor according to one or more example embodiments may determine information about an offset value of the optical lens for each of the first and second color channels. In the second function group, the offset value may be the movement distance ΔLP of the optical lens, when the disparity is 0. Offset values for each of the first and second color channels may be different from each other. Referring to FIGS. 11A and 11B, the offset value may be changed depending on the position LP of the lens when the disparity is 0 in the first function group and the position LP of the optical lens at which sharpness of the third color channel is maximized.

Referring to the following Equation 4, a function in which a movement distance ΔLP_r of a lens for focusing in a first color channel has a first disparity conversion coefficient DCC_r as a slope, disparity disp(PD_y) in the first color channel as a variable X, and an offset value o_r as a Y-intercept may be represented. A movement distance ΔLP_b of the lens for focusing in a second color channel may also be expressed in a similar manner as above.

Disparity values for each of the first and second color channels may be calculated from image data output from an image sensor. In order for the processor to calculate the disparity value from the image data, the disparity conversion coefficient and offset for each of the first to third color channels may be determined in advance, and may be loaded into the processor in advance.

$$\Delta LP_r = DCC_r * disp(PD_Y) + o_r \qquad \text{[Equation 4]}$$

$$\Delta LP_b = DCC_b * disp(PD_Y) + o_b$$

Figure 13:
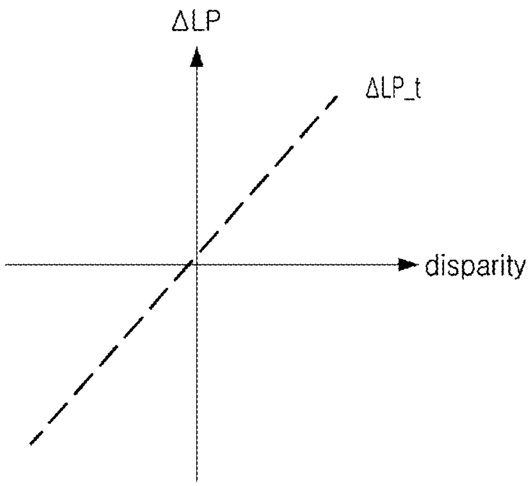

Referring to FIG. 13, a processor according to one or more example embodiments may determine a final movement distance ΔLP_t of an optical lens by weighting movement distances ΔLP_r and ΔLP_b of the optical lens according to disparity for each of first to second color channels.

A processor according to one or more example embodiments may apply weights $W_R$ and $1-W_R$ to each of the movement distances ΔLP_r and ΔLP_b of the optical lens according to the disparity for each of the first and second color channels. Referring to the following Equation 5, the weights $W_R$ and $1-W_R$ may be determined using at least one of a ratio of the first color channel and the third color channel (R/G), a ratio of the second color channel and the third color channel (B/G), and a white balance gain (WBgain) that may be obtained from image data output from an image sensor.

[Equation 5]

$$\Delta LP_t = W_r(DCC_r * disp(PD_Y) + o_r) + (1 - W_r)_B(DCC_b * disp(PD_Y) + o_b)$$

$$W_R = F\left(\frac{R}{G}, \frac{B}{G}, WBgain\right)$$

Referring to FIG. 13, a processor according to one or more example embodiments may determine the final movement distance ΔLP_t of the optical lens. The final movement distance ΔLP_t of the optical lens may be a value obtained by adding the product of the weight $W_R$ of the first color channel and the lens movement distance ΔLP_r according to the disparity of the first color channel, and the product of the weight $1-W_R$ of the second color channel and the lens movement distance ΔLP_b according to the disparity of the second color channel. The final movement distance ΔLP_t of the optical lens may also be modeled as a linear function. Referring to Equation 5, when determining the final movement distance ΔLP_t of the optical lens, disparity conversion coefficients DCC_r and DCC_b and offset values o_r and o_b for each of the first to second color channels may be information loaded in advance, and the disparity value disp(PD_y) and weights $W_R$ and $1-W_R$ for each of the first to second color channels may be calculated as information included in the image data output from the image sensor.

Figure 14:
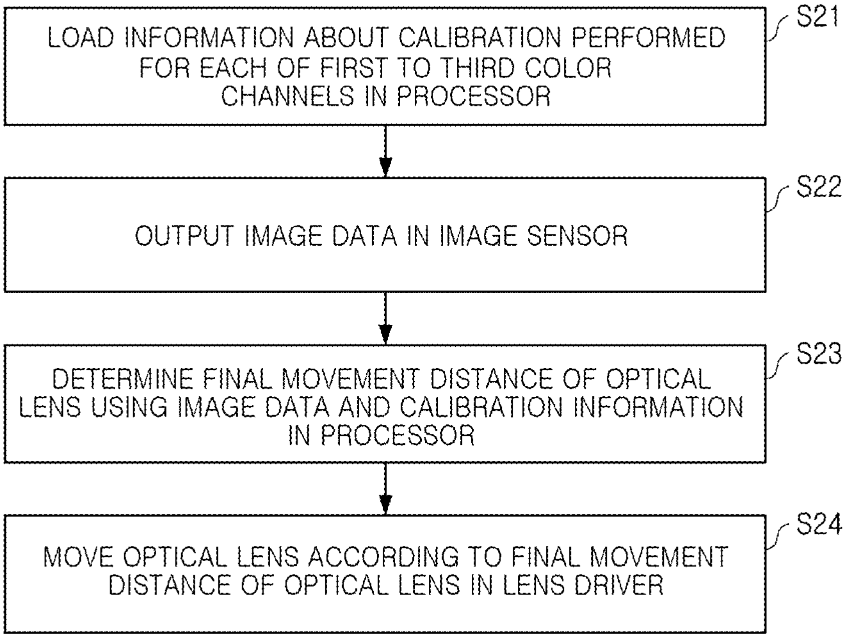
FIG. 14 is a flowchart illustrating a process of obtaining a final movement distance of an optical lens according to one or more example embodiments.

FIG. 14 is a flowchart illustrating a process of obtaining a final movement distance of an optical lens according to one or more example embodiments.

A processor according to one or more example embodiments may load information (or calibration information) about calibration performed for each of first to third color channels (S21). A first function group that models a relationship of disparity according to a position of an optical lens for each of the first to third color channels, and information based on a position of the optical lens at which sharpness of the third color channel is maximized may be loaded. The processor may determine a second function group that models a movement distance of the optical lens according to the disparity for each of the first to third color channels, based on the loaded information based on the position of the optical lens at which sharpness of the third color channel is maximized. By performing calibration for each of the first to third color channels, focus may be adjusted to maximize sharpness of the third color channel, which has a significant impact on resolution, and resolution of image data may be improved. The functions included in the first function group or the second function group may include a disparity conversion coefficient and an offset value for each of the first to third color channels. In an embodiment, information about performing calibration for each of the first and second color channels may be loaded.

An image sensor according to one or more example embodiments may output image data (S22). From the image data including phase information, the processor may calculate a disparity value for each of the first to third channels. In addition, the processor may obtain a white balance gain from the image data, and may calculate a weight for each of the first to third color channels using the obtained white balance gain.

A processor according to one or more example embodiments may determine a final movement distance of the optical lens using the image data and calibration information (S23). For the second function group, the disparity conversion coefficient and the offset value for each of the first to third color channels used in calibration of the first to third color channels (or the first and second color channels) loaded into the processor may be applied, and the disparity value and the weight for each of the first to third color channels calculated from the image data may be applied to calculate the final movement distance of the optical lens.

A lens driver according to one or more example embodiments may move the optical lens according to the final movement distance of the optical lens (S24). The processor may determine the final movement distance of the optical lens based on above operations. The processor may transmit a control signal for the final movement distance of the optical lens to the lens driver. The lens driver may adjust the position of the optical lens according to the control signal provided by the processor. The lens driver may move the optical lens in a direction in which a distance to a subject increases or decreases, according to the final movement distance of the optical lens.

According to one or more example embodiments, based on a position of an optical lens at which sharpness of a third color channel, which may be a green channel, is maximized, an image processing system may determine a movement distance of the optical lens according to disparity for each of first to third color channels, may determine a weight for each of the first to third color channels from image data generated by an image sensor, and may apply the weight to the movement distance of the optical lens for each of the first to third color channels, to determine a final movement distance of the optical lens, thereby improving resolution of an image by focusing on the green channel having high sensitivity.

At least one of the components, elements, modules or units (collectively "components" in this paragraph) represented by a block in the drawings, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, and/or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Various advantages and effects of the disclosure are not limited to the above-described contents, and will be more easily understood in the process of explaining specific embodiments.

While example embodiments have been illustrated and described above, it will be apparent to those skilled in the art that modifications and variations could be made without departing from the scope of the disclosure as defined by the appended claims and their equivalents.

What is claimed is:

1. An image processing system comprising:

an optical lens;

a lens driver configured to move the optical lens;

an image sensor configured to convert an optical signal transmitted from the optical lens into an electrical signal, to generate image data; and a processor configured to perform image signal processing on the image data, wherein the image data includes a first color channel, a second color channel, and a third color channel, wherein the processor is further configured to:

based on a modeled relationship between a disparity and a position of the optical lens for each of the first to third color channels, and further based on a position of the optical lens at which a sharpness of the third color channel is maximized, determine, for each of the first to third color channels, a movement distance of the optical lens according to the disparity;

determine a disparity value and a weight for each of the first to third color channels from the image data; and apply the disparity value and the weight to the movement distance of the optical lens for each of the first to third color channels, to determine a final movement distance of the optical lens, and wherein the lens driver is further configured to move the optical lens according to the final movement distance of the optical lens.

2. The image processing system of claim 1, wherein the processor is further configured to determine, for each of the first to third color channels, a disparity conversion coefficient based on the modeled relationship between the disparity and the position of the optical lens.

3. The image processing system of claim 2, wherein the processor is further configured to determine, for each of the first to third color channels, the movement distance of the optical lens according to the disparity for a corresponding color channel by multiplying the disparity conversion coefficient of the corresponding color channel by the disparity value of the corresponding color channel, and adding an offset value of the corresponding color channel.

4. The image processing system of claim 3, wherein the processor is further configured to determine the offset value based on the position of the optical lens in which the sharpness of the third color channel is maximized.

5. The image processing system of claim 1, wherein the processor is further configured to determine, for each of the first to third color channels, the weight by using at least one of a ratio of the first color channel and the third color channel, a ratio of the second color channel and the third color channel, and a white balance gain, that are extracted from the image data.

6. The image processing system of claim 1, wherein the image sensor is further configured to output the image data for each frame cycle, and the processor is further configured to determine the weight of each of the first to third color channels based on the image data output for each frame cycle.

7. The image processing system of claim 1, wherein the processor is further configured to determine the final movement distance of the optical lens by multiplying, for each of the first to third color channels, the movement distance of the optical lens for a corresponding color channel by the weight for the corresponding color channel, and adding results of a multiplication for the first to third color channels.

8. The image processing system of claim 1, wherein the modeled relationship is such that, with respect to a same position of the optical lens for each of the first to third color channels, disparity values of two or more of the first to third color channels are different from each other.

9. The image processing system of claim 1, wherein the modeled relationship is such that, with respect to a same disparity value for each of the first to third color channels, positions of the optical lens focused on two or more of the first to third color channels are different from each other.

10. The image processing system of claim 1, wherein the optical lens comprises a plurality of lenses.

11. The image processing system of claim 1, wherein the optical lens is configured to generate longitudinal chromatic aberration.

12. The image processing system of claim 1, wherein the third color channel is a green channel.

13. The image processing system of claim 1, wherein the image sensor includes a pixel array including a plurality of pixels, and wherein the plurality of pixels include phase-detection (PD) pixels.

14. An image processing system comprising:

an optical lens;

a lens driver configured to move the optical lens;

an image sensor configured to convert an optical signal transmitted from the optical lens into an electrical signal, to generate image data; and a processor configured to perform image signal processing on the image data, wherein the image sensor includes a pixel array including a plurality of pixels, each of the plurality of pixels includes a color filter, and the color filter includes a first color filter, a second color filter, and a third color filter, respectively configured to transmit light of different wavelengths, and pixels including the first color filter and pixels including the second color filter include at least one phase-detection (PD) pixel, wherein the image data includes a first color channel, a second color channel, and a third color channel, and wherein the processor is further configured to:

based on a modeled relationship between a disparity and a position of the optical lens for each of the first color channel and the second color channel, and further based on a position of the optical lens at which sharpness of the third color channel is maximized, determine, for each of the first to third color channels, a movement distance of the optical lens according to the disparity;

determine a disparity value and a weight for each of the first color channel and the second color channel from the image data, and apply the disparity value and the weight to the movement distance of the optical lens for each of the first color channel and the second color channel, to determine a final movement distance of the optical lens, and wherein the lens driver is further configured to move the optical lens according to the final movement distance of the optical lens.

15. The image processing system of claim 14, wherein the pixel array comprises:

a first pixel group including four unit pixels including the first color filter, wherein the four unit pixels of the first pixel group share a micro lens;

a second pixel group including four unit pixels including the second color filter, wherein the four unit pixels of the second pixel group share one micro lens; and a third pixel group including four unit pixels including the third color filter, wherein each of the four unit pixels of the third pixel group includes one micro lens.

16. The image processing system of claim 15, wherein the pixel array comprises the first pixel group as one pixel, the second pixel group as one pixel, and the third pixel group as two pixels, arranged in a Bayer pattern.

17. The image processing system of claim 14, wherein the pixel array comprises:

a first pixel group including four unit pixels including the first color filter, wherein, among the four unit pixels of the first pixel group, two unit pixels share one micro lens and each of remaining two unit pixels include one micro lens;

a second pixel group including four unit pixels including the second color filter, wherein, among the four unit pixels of the second pixel group, two unit pixels share one micro lens and each of remaining two unit pixels include one micro lens; and a third pixel group including four unit pixels including the third color filter, wherein each of the four unit pixels includes one micro lens.

18. The image processing system of claim 17, wherein the pixel array comprises the first pixel group as one pixel, the second pixel group as one pixel, and the third pixel group as two pixels, arranged in a Bayer pattern.

19. The image processing system of claim 14, wherein the processor is further configured to determine the final movement distance of the optical lens by multiplying, for each of the first to third color channels, the movement distance of the optical lens for a corresponding color channel by the weight for the corresponding color channel, and adding results of a multiplication for the first to third color channels.

20. An image processing system comprising:

an optical lens;

a lens driver configured to move the optical lens; and a processor configured to perform image signal processing on image data including a first color channel, a second color channel, and a third color channel, wherein the processor is further configured to:

load a first function group including first linear functions that model a relationship between a disparity and a position of the optical lens for each of the first to third color channels, and load position information of the optical lens at which a sharpness of the third color channel is maximized;

determine a reciprocal number of a slope of each of the first linear functions as a disparity conversion coefficient for each of the first to third color channels; and determine an offset value for each of the first to third color channels using an X-intercept of each of the first linear functions and the position information;

generate, for each of the first to third color channels, second linear functions having the disparity conversion coefficient as a slope and the offset value as a Y-intercept, to generate a second function group; and control the lens driver to move the optical lens according to a final movement distance of the optical lens, which is obtained based on the second function group.

* * * * *